UNITED STATES PATENT OFFICE.

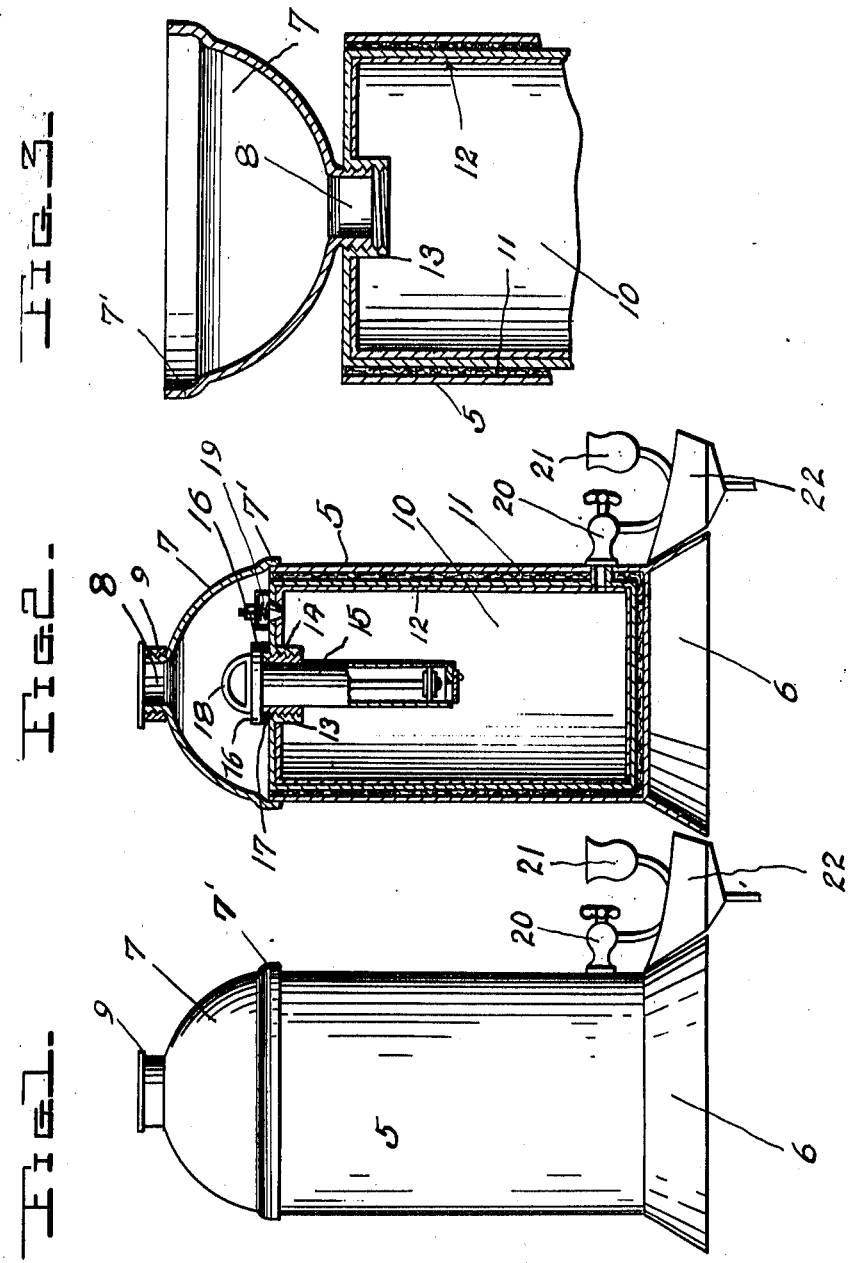

PORTER S. HAMRICK, OF WAUSAU, WISCONSIN.

FORCE-FEED RESERVOIR.

1,020,602.  Specification of Letters Patent.  Patented Mar. 19, 1912.

Application filed December 2, 1911. Serial No. 663,560.

*To all whom it may concern:*

Be it known that I, PORTER S. HAMRICK, a citizen of the United States, residing at Wausau, in the county of Marathon and State of Wisconsin, have invented certain new and useful Improvements in Force-Feed Reservoirs, of which the following is a specification, reference being had to the accompanying drawings.

This invention relates to force feed tanks or reservoirs and has for its object to provide a device of this character which is primarily adapted for use in combination with a drinking fountain whereby sufficient pressure of air upon the water contained in the tank is maintained to cause the water to be forcibly ejected upwardly from a sanitary drinking cup.

Another object of the invention resides in the provision of a tank consisting of inner and outer concentric walls having mineral wool or other non-heat-conducting material arranged between them, said inner tank being closed at its top and bottom and having a pump arranged in its top wall and depending into the same and a cover for said tank capable of being inverted to provide a filling funnel having a neck for threaded engagement in an inwardly extending neck formed on the tank.

A still further object of the invention is to provide a simple, efficient and durable device of the above character including means whereby the pressure of air within the tank may be easily and quickly renewed.

With the above and other objects in view, the invention consists of the novel features of construction, combination and arrangement of parts hereinafter fully described and claimed, and illustrated in the accompanying drawings, in which—

Figure 1 is a side elevation of my improved tank or reservoir; Fig. 2 is a vertical section thereof; and Fig. 3 is a similar view showing the top inverted to provide a filling funnel.

Referring in detail to the drawing 5 designates the outer cylindrical shell of the tank which is provided at its lower end with an outwardly flared annular flange 6 to form a supporting base. A substantially semicircular dome-shaped top 7 is provided for this outer shell and is formed at its edge with a flange 7' for frictional engagement over the upper open end of said shell. The center of the cover 7 is provided with a short neck 8 which is exteriorly threaded to receive a screw cap 9.

The inner shell 10 is arranged in spaced concentric relation to the outer shell, said inner shell being closed at its top and bottom as clearly shown. The space between the inner and outer shells is filled with mineral wool, charcoal or other non-heat-conducting material indicated at 11. The inner shell 10 is preferably provided upon its inner surface with an enamel lining 12 and the top thereof is centrally formed with the inwardly extending annular flange 13 which is threaded to receive the upper enlarged end 14 of the pump casing 15. The upper end of the pump casing is further provided with a flange 16 between which and the top wall a packing gland 17 is arranged whereby the inner vessel is rendered practically air-tight. The air pump may be of any desired or preferred form, the same including a plunger provided with a handle 18 upon its upper end whereby the same may be operated. The upper portion of the pump which projects above the inner vessel is entirely inclosed and hidden from view by the dome-shaped removable top 7 of the outer vessel. A safety air valve 19 is also provided in the top wall of the inner vessel whereby liability of the bursting of the tank from an excess of pressure is entirely eliminated.

The faucet 20 is attached to the tank and communicates with the inner vessel at its extreme lower end. This faucet and the fountain may be of any approved type and as shown includes a sanitary drinking cup 21 and a catch basin 22.

In the operation of the device, the pump is operated until sufficient air pressure is secured in the upper end of the inner vessel 10 to eject the water from the fountain cup 21, causing a continuous bubbling thereof by the force of the water as it enters the cup. It is of course understood that the lower portion of the inner vessel of the reservoir is first filled with water before the pump is inserted therein. This filling of the reservoir is facilitated by removing the cap 9 from the cover 7 of the tank and inverting said cover and threading the neck 8 thereof in the annular inwardly disposed flange 3 of the top of the inner vessel 10. Owing to the form and capacity of the cover 7 it will be obvious that the tank may be very quickly supplied with water.

From the foregoing it is believed that the construction and operation of my improved fountain tank or reservoir will be fully understood. The device is simple and durable in construction and provides inexpensive means whereby a continuous flow of the water at the desired pressure may be maintained, thus rendering the fountain perfectly sanitary. The fountain may also be easily and quickly entirely removed from the reservoir and cleaned or repaired.

While I have shown and described the preferred form and construction of the various parts, it will be obvious that the invention is susceptible of many minor modifications without departing from the essential feature or sacrificing any of the advantages thereof.

Having thus described the invention what is claimed is:—

A tank or reservoir of the character described comprising inner and outer concentrically arranged shells, said inner shell being closed at its top and bottom and centrally provided with an inwardly extending threaded annular flange, a pump removably secured in the flange of said top, a dome-shaped cover for the upper end of the outer shell having a central opening and a threaded neck surrounding said opening, said cover being adapted to be inverted to engage the threaded neck thereof in the threaded flange of the top wall of said inner vessel to facilitate the filling of said inner vessel, and a fountain supply pipe extending through the walls of said inner and outer vessels at their lower ends.

In testimony whereof I hereunto affix my signature in the presence of two witnesses.

PORTER S. HAMRICK.

Witnesses:
F. S. MILLER,
WILL L. DOLESCHAL.